Nov. 17, 1953     F. JONKER     2,659,507

BEVERAGE CONTAINER

Filed July 13, 1951

Frederick Jonker,
INVENTOR,

BY Homer R. Montague,
ATTORNEY

Patented Nov. 17, 1953

2,659,507

UNITED STATES PATENT OFFICE 2,659,507

BEVERAGE CONTAINER

Frederick Jonker, Washington, D. C.

Application July 13, 1951, Serial No. 236,590

2 Claims. (Cl. 215—31)

This invention pertains to containers, and particularly to improvements in the design of beverage containers.

It is a principal object of the invention to provide a container whose contents may be drunk directly without the difficulties encountered by many users in getting the contents to flow properly against the partial vacuum created when an initial portion of the drink has entered the mouth.

A further object of the invention is to provide a design for the mouth portion of a beverage container which will ensure the drinker's ability to maintain a desired flow without any spilling of the liquid, and without the necessity for the use of soda straws, tumblers or the like. Present-day methods of bottle cleaning and sterilization are such that straws (tubes) are not often required for sanitary reasons, but their use continues principally to facilitate obtaining the desired control of the beverage. Many people seem incapable of developing the correct knack of drinking directly from a narrow-mouth beverage bottle of conventional design, or their oral anatomy may preclude success in this effort.

Still another object of the invention is to provide a bottle of the above type which is so similar to conventional bottles in size and shape that it may be handled, filled and capped without change in existing handling equipment, and which will require only minor changes in the molds and dies used in manufacturing the containers and their closure caps.

The above and other objects of my invention will best be understood from the following detailed specification of certain preferred embodiments thereof, taken in connection with the appended drawings, in which.

Figure 1:
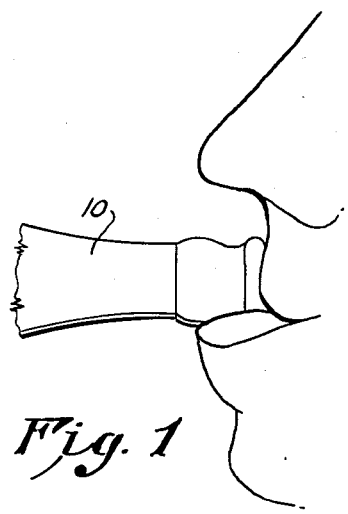
Fig. 1 is a schematic view of the relationship of a conventional bottle while the contents are being imbibed, more in particular when the initial draft is taken.

Referring now to Fig. 1 of the drawings, a conventional beverage bottle 10 is shown in place against a drinker's mouth, when the initial drafts are being taken and the bottle is still in a substantially horizontal position. At the commencement of each drink, liquid flows readily from the bottle 10, whose mouth is supported on the drinker's lower lip. When a part of the liquid has left the bottle, however, a partial vacuum is formed in the space above the liquid, and the flow is therefore interrupted. If an attempt is made to restore the flow by tipping up the bottle, the increased gravity head may improve matters temporarily, but the flow again stops as the vacuum becomes greater. With the bottle in such a tilted position, spillage is inevitable when it is removed from the mouth, whether this removal is complete or if the drinker is belatedly trying to permit air to enter to restore normal atmospheric pressure in the bottle. Continuous drinking, or even adequate draughts, are impossible for many persons with this arrangement.

Certain persons are fairly successful in balancing the various factors so that a slight entry of air above the liquid level is permitted, to eliminate the vacuum but without permitting leakage, but few are so adept that the operation is always successful. Also, those persons who prefer to insert the entire bottle end in the mouth find that no amount of practice enables more than very brief sips of liquid to enter the mouth at successive attempts.

Figure 2:
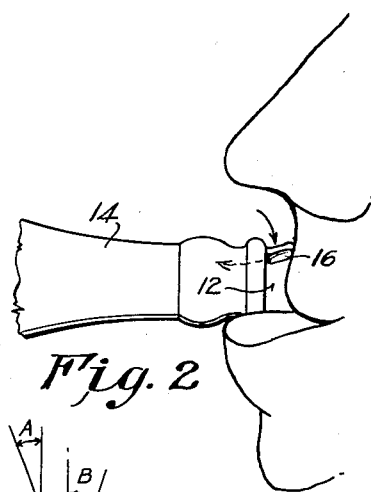
Fig. 2 is a similar view showing the use of my improved bottle, more in particular when the initial draft is taken.

The present invention overcomes these difficulties by simple but important changes in the structure of the mouth end of the bottle. As shown in Fig. 2, this is accomplished generally by providing a short auxiliary neck or top portion 12 on the modified bottle 14, the same being provided with radial notches, grooves or like orifices 16 on at least one side. With the bottle in the position shown, air can enter the space above the liquid (as indicated by arrows in Fig. 2) to replace the volume of liquid withdrawn, and a continuous flow results, controlled as to rate merely by the angle at which the bottle is held. Fig. 2 shows the bottle in a substantially horizontal position, when the first drafts are being taken. As the bottle is being emptied it will be tilted more and more and as a consequence the grooves 16 will tend to become almost completely shut off by the upper lip on the outside. The constructional measures taken to prevent this, will be discussed in a later section.

Beverage bottles or containers of the type with which my invention is concerned are normally sealed or capped by a crown closure of familiar form, which is clamped about a bead at the top extremity of the bottle, and contains a resilient disc which is held in firm engagement with the annular end of the top of the bottle. The problem of retaining this general type of closure, whose economy and familiarity have much to recommend its use, is a considerable one.

Figures 3, 4, 5:
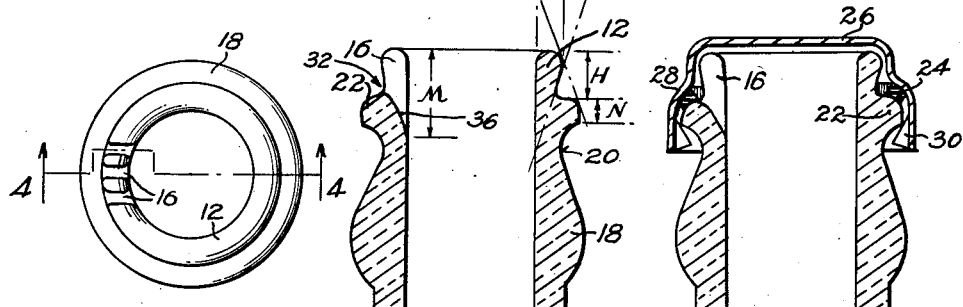
Fig. 3 is a plan view of the upper portion of a preferred form of the new bottle.
Fig. 4 is a sectional view taken on line 4—4 of Fig. 3.
Fig. 5 is a sectional view similar to Fig. 4 but showing a preferred form of closure cap in place.

Referring now to Figs. 3, 4 and 5 of the drawings, the structure of the novel bottle is shown in more detail. As in conventional bottles, a gentle bulge 18 is formed slightly below the end of the bottle (for strength particularly required during filling, capping and other handling), this bulge terminating upwardly in a necked-down portion 20 surmounted by a bead or ring 22. The bead 22 in a conventional bottle provides the annular top edge or wall against which the sealing disc (of cork or the like) is pressed by the crown cap, whose inturned serrations clamp against the under side of the bead. Space for this serrated skirt portion of the cap is provided by the annular groove or necked-down portion 20.

In my improved design, the bead or ring 22 remains the seat for the sealing element, but the latter can no longer rest upon the top surface of the bottle mouth. As clearly shown in Figs. 3 and 4, the upward extension or auxiliary neck 12 is provided with the passages or grooves 16, here shown as three in number, although more or fewer can be employed. Also, these grooves are shown as located adjacent one end of a diameter of the neck 12, but as will be pointed out, they could be distributed around the periphery. Since the top surface of the bottle is no longer continuous, sealing in the usual way cannot be accomplished. However, ring or bead 22 does present a continuous surface, and as shown in Fig. 5, I provide the desired closure seal by a ring 24 which may be of rubber, cork or other resilient material, preferably cemented or otherwise secured within the cap 26. This cap may have a shoulder 28 about it to define the seat for ring 24, and also is provided with the serrated skirt portion 30 for engagement beneath bead 22 in the known manner.

It will be observed that the outer diameter of the bead 22 must be greater than that of any part of the auxiliary neck 12 in order to permit the cap to be placed upon the bottle with ease in the sealing position. This protrusion of ring or bead 22 is shown in Fig. 4 by a dash line drawn tangent to the bead 22 and the rounded top of the auxiliary neck 12, making an angle A with the vertical. It will also be seen that the outer marginal wall of the auxiliary neck 12 is inclined inwardly at an angle B with the vertical, thus being frusto-conical. The intersection of this inclined wall with the upper surface of bead 22 provides in effect a circular channel 32 encircling the bottle mouth and in communication with the passages 16. I have found that if angles A and B are properly chosen, and the heights N (of bead 22) and H (of auxiliary neck 12) are correctly related, this channel around the neck 12 cannot be closed off by the lips. Therefore, referring again to Fig. 2, even if the upper lip engages the upper part of the bottle mouth so as to cover a major portion of passages 16, as will be the case when the bottle becomes partly empty and is tilted sharply, this circular channel allows air to enter (for example at points adjacent the "corners" of the user's mouth) and pass around this channel and thence into the bottoms of passages 16 and thence into the bottle. The same is true if the entire end of the bottle is inserted in the mouth, due to the non-circularity of the orifice formed by the lips under such conditions.

The angle A preferably has a value not greater than 45°, and may be much smaller, say of the order of 20°; angle B is shown as of about the same value, but may range from 0° to 45° also. These values eliminate all possibility that the lips can shut off the ingress of air during drinking. Preferably, the passages or grooves 16 have their bottom surfaces slanted downwardly as at 36 so that they cannot inadvertently be closed off (from inside) by a part of the upper lip which may enter the mouth of the bottle.

The height M is preferably at least twice the height H to provide an adequate portection against the stoppage of annular channel 32 by the lips when the bead 22 and auxiliary neck 12 are of the diameters shown, which are based on dimensions of present standard beverage bottles.

If special manufacturing provisions are made, it is even possible to incline the horizontal top surface of bead 22 downwardly and inwardly, so that no matter how small the auxiliary neck portion 12, the annular groove formed by the horizontal top surface of bead 22 and the outer surface of neck portion 12 cannot be sealed off by the upper lip, no matter how much the bottle is tilted.

Figure 6:
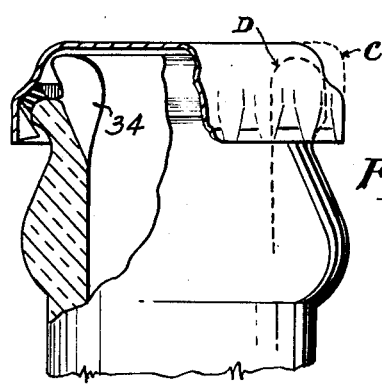
Fig. 6 is a view, partly broken away, of a modified form of the invention.

Fig. 6 of the drawings shows a somewhat modified design of bottle and closure which effects a reduction in the height of the latter so that its dimensions fall within those of the standard cap. The dimension H has been slightly reduced, without departing substantially from the optimum angles and relationships given above. The dotted line C in this figure shows the unmodified profile of the standard cap, and dotted line D shows the profile of the standard beverage bottle. As shown at the left of Fig. 6, the inside of the neck may be given a slight bulge 34 extending around the neck for increased strength.

The invention has been shown in connection with a container or bottle made of glass, but can equally well be applied to metal containers, such as the beer cans whose necks are formed to use the crown type of closure.

I am aware that it has been proposed to modify beverage bottles so as to eliminate the formation of a partial vacuum as the contents are consumed, but so far as I am aware all such efforts have failed due to difficulties in their execution or lack of appreciation of the actual requirements of an acceptable and efficient solution. While I have shown in detail a preferred form of the invention, it is to be understood that modifications of a minor nature may be made therein without departing from the scope of my invention as defined in the appended claims.

I claim:

1. A beverage bottle arranged to facilitate drinking therefrom by preventing the formation of a partial vacuum, said bottle having a neck portion comprising an annular sealing bead, an auxiliary annular neck portion extending above said bead, the maximum diameter of said auxiliary neck portion being smaller than that of said bead, and one or more lateral passages extending through the wall of said auxiliary neck portion from the top thereof downwardly to the level of the upper surface of said bead, said lateral passages extending axially within the bead and the bottom of each being inclined from the juncture of the outer wall of said auxiliary neck portion with the upper surface of said bead sharply downward toward the interior of said container.

2. A bottle in accordance with claim 1, in which the outer annular surface of said auxiliary neck portion is inclined downwardly and inwardly to define with the top surface of said bead an annular re-entrant groove opening outwardly of said neck portion, said groove being in communication with said passage.

FREDERICK JONKER.

References Cited in the file of this patent

UNITED STATES PATENTS

| Number | Name | Date |
|---|---|---|
| 162,117 | Synnett | Apr. 13, 1875 |
| 781,702 | Waugh | Feb. 7, 1907 |
| 1,930,162 | Eckard | Oct. 10, 1933 |
| 1,961,033 | Bicks | May 29, 1934 |
| 2,080,144 | Lufkin | May 11, 1937 |
| 2,126,390 | Jackson | Aug. 9, 1938 |
| 2,221,527 | Schick | Nov. 12, 1940 |
| 2,445,647 | Thomas | July 20, 1948 |

FOREIGN PATENTS

| Number | Country | Date |
|---|---|---|
| 194,163 | Switzerland | Feb. 1, 1938 |